Dec. 8, 1936.  U. BARSKE  2,063,145
HYDRAULIC TRANSMISSION GEAR FOR LAND VEHICLES
IN PARTICULAR RAILWAY VEHICLES
Filed Sept. 11, 1933  3 Sheets-Sheet 1

Dec. 8, 1936.     U. BARSKE     2,063,145
HYDRAULIC TRANSMISSION GEAR FOR LAND VEHICLES
IN PARTICULAR RAILWAY VEHICLES
Filed Sept. 11, 1933     3 Sheets-Sheet 2

Dec. 8, 1936.  U. BARSKE  2,063,145
HYDRAULIC TRANSMISSION GEAR FOR LAND VEHICLES
IN PARTICULAR RAILWAY VEHICLES
Filed Sept. 11, 1933  3 Sheets-Sheet 3

Inventor:
Ulrich Barske,
By Potter, Pierce & Scheffler,
Attorneys.

Patented Dec. 8, 1936

2,063,145

UNITED STATES PATENT OFFICE 2,063,145

HYDRAULIC TRANSMISSION GEAR FOR LAND VEHICLES, IN PARTICULAR RAILWAY VEHICLES

Ulrich Barske, Hanover, Germany, assignor to Franz Kruckenberg and Curt Stedefeld, both of Hanover, Germany Application September 11, 1933, Serial No. 689,051. In Germany September 15, 1932

6 Claims. (Cl. 105—109)

The invention relates to a hydraulic transmission gear for land vehicles, in particular railway vehicles.

When such vehicles are driven by internal combustion engines through change speed gears, the engine and gears are usually supported on a sprung part, e. g. the frame, and the turning moment is transmitted to the axle by suitable means. If coupling rods or chains which often cannot be employed for constructional or operational reasons, are not used, the power transmission to the axle must be effected through jointed shafts. These must be able to transmit the high torques which arise in starting and ascending inclines, involving a heavy and expensive construction of the joints. But in plants of high power, experience shows that such joints are inclined to break down in service despite all precautions.

The operating conditions for the jointed shaft are considerably improved if it is arranged between the engine and the change speed gear, so that it only has to transmit the relatively low and almost unchanging engine torque. It is then possible to mount the change speed gear wholly or partly on the unsprung axle. But multi speed toothed wheel gearing is very unsuitable for this arrangement because its life and reliability, especially at high speeds is much reduced by the shocks arising. Moreover with large powers such gears are so heavy that they render the unsprung weight excessive.

The same applies even more strongly to cylinder and piston hydraulic gears, which accordingly have not in practice superseded toothed wheel change speed gears. The subdivision of such gears so that the pump is sprung with the engine, and the hydraulic motor is semi-sprung on the axle effects a certain reduction of the unsprung weight, but increases the number of parts and the delicacy of the plant owing to the jointed conduits for liquid under pressure which become necessary, and also increases the total weight and reduces the efficiency of the transmission.

Only the use of a hydrodynamic gear of the Föttinger type makes the above described gear arrangement, which is so advantageous for the reasons set forth, operationally desirable and long wearing. The gear is so light that even with high powers the increase in unsprung weight remains within permissible limits. The space occupied by, and weight of, such a gear can moreover be considerably reduced by increasing the speed of rotation, because the power capacity varies as the third power of the speed whereas in the cylinder and piston hydraulic gears it varies only as the first power.

Owing to the simple internal construction even heavy shocks do not affect the reliability of such gears. On the contrary the shaft joints are considerably spared owing to the great rotational damping effect of Föttinger gears particularly with internal combustion engine drives, and owing to the elimination of any rotational shocks during clutching and declutching which as is known are effected respectively by filling and emptying the gear.

By arranging the axis of the hydraulic gear longitudinally of the vehicle, sufficient space is available to accommodate a plurality of liquid circuits, that is a plurality of hydraulic speeds while the whole space within the vehicle framing is available for the diameter of the gearing. In this manner there can be accommodated change speed gears of highest power and suitable to all purposes which was up to this date not possible by the application of other constructions of gears.

The principal features of the present invention consist therefore in the engine being connected with the gears by a jointed shaft and the increase in turning moment being effected only at the axle by semi-sprung Föttinger gears the axes of which lie longitudinally of the vehicle. The gears can be single or multi speed gears.

Figure 1:
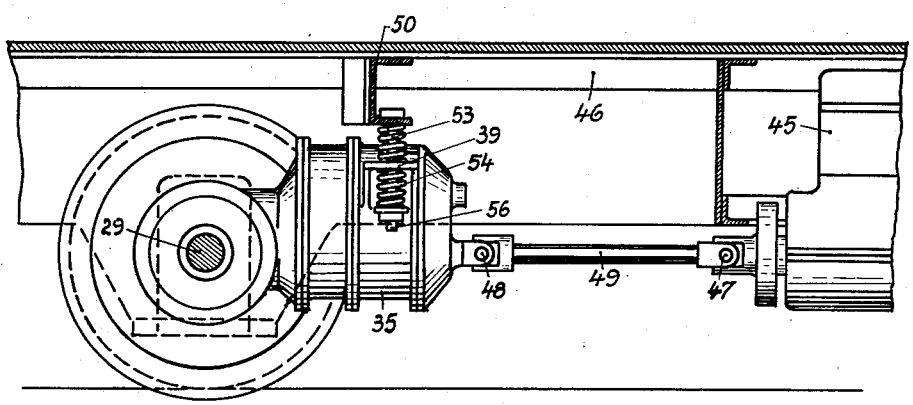
Fig. 1 is a fragmentary longitudinal section through the running gear of a railroad car provided with a drive according to the invention.

In the drawings, the reference numeral 45 identifies the internal combustion engine which is mounted on the car frame 46 which is supported by springs from the axle 26, the engine driving the vehicle through the shaft 49 which is connected by universal joints 47, 48, with the engine shaft and with the driving shaft 11, (see Figs. 3 to 6) of the hydraulic gearing located within the housing 35 on axle 29. The housing 35 is supported, in part, from the axle 29 by means of the bearings 36, 37 and, in part, from the transverse beam 50 of the car frame 46 through the springs 51—54. Arms 38, 39 are secured to, or integral with, the housing and extend between the pairs of springs 51, 52 and 53, 54 which are carried by bolts 55, 56, respectively, that extend below the beam 50.

Figure 2:
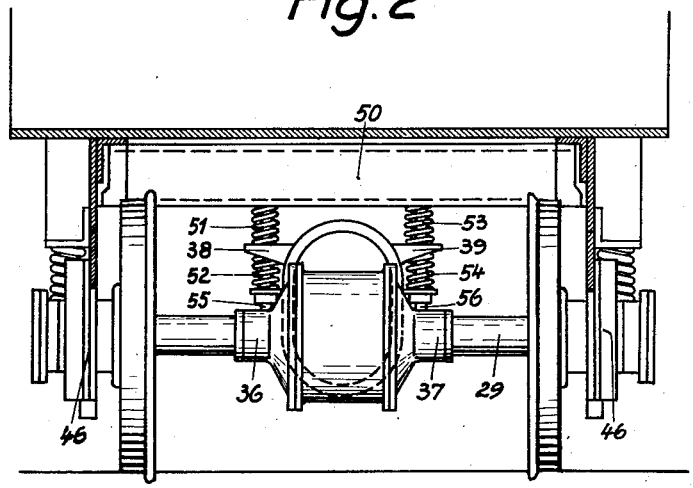
Fig. 2 is a transverse vertical section as viewed from the left side of Fig. 1.

In regard to the inner structure of the gearing, the only important feature is that Föttinger gearing is used for the transmission of power, its shafts running lengthwise of the car since in that way the above described structural advantages are attained. The details of the gearing shown in Figs. 1 and 2 can be seen from Figs. 3 and 4.

The shaft 11 of the gearing is connected to the driving shaft 49 through the coupling 48 and through the toothed wheels 12 and 13, drives the shaft 14 on which are fast the pump wheels 15 and 18 of the Föttinger gears 15/16/17 and 18/19/20 respectively. The secondary wheels 16 and 19 loose upon the shaft 14 are fast to toothed wheels 21, 22 respectively with which mesh wheels 23 and 24 respectively, fast upon the shaft 25. By filling the Föttinger gears 15/16/17 or 18/19/20 as desired the shaft 25 can be driven through the train 21/23 or 22/24. The torque of the shaft 24 is transmitted to the vehicle axle 29 lying transverse to it for example through a bevel wheel reverse gear 26/27/28. In known manner the bevel wheel 26 fast on the shaft 25 meshes with the bevel wheels 27 and 28 loose upon the axle 29. By sliding the sleeve 30 keyed to the axle, bevel wheel 27 or 28 can be clutched to the axle and the drive conveyed in the desired direction. In the illustrated example the drive is conveyed through cone clutches 31/32 and 33/34.

If desired the shaft 29 can be parallel with the actual vehicle axle and drive the latter through toothed wheels or the like.

Figure 3:
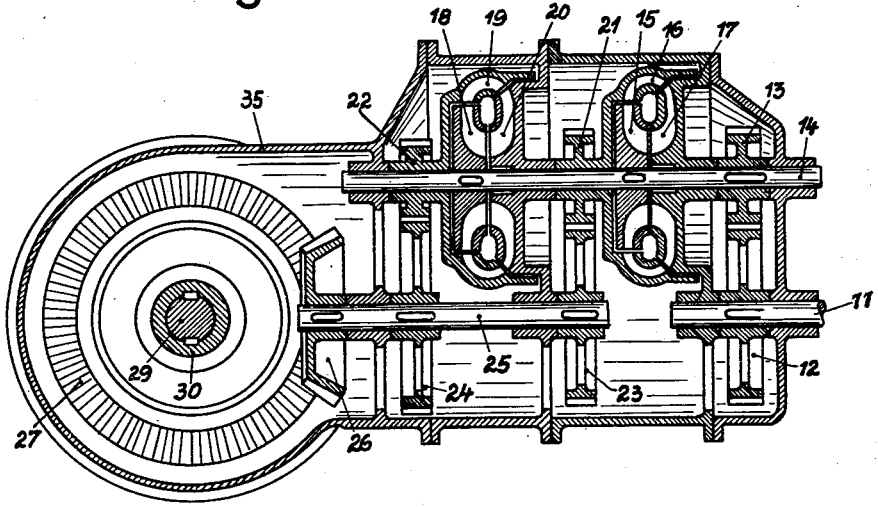
Figs. 3 and 4 are, on a larger scale, the vertical and horizontal central sections, respectively, through the hydraulic gearing used in the drive according to Fig. 1.
Figure 4:
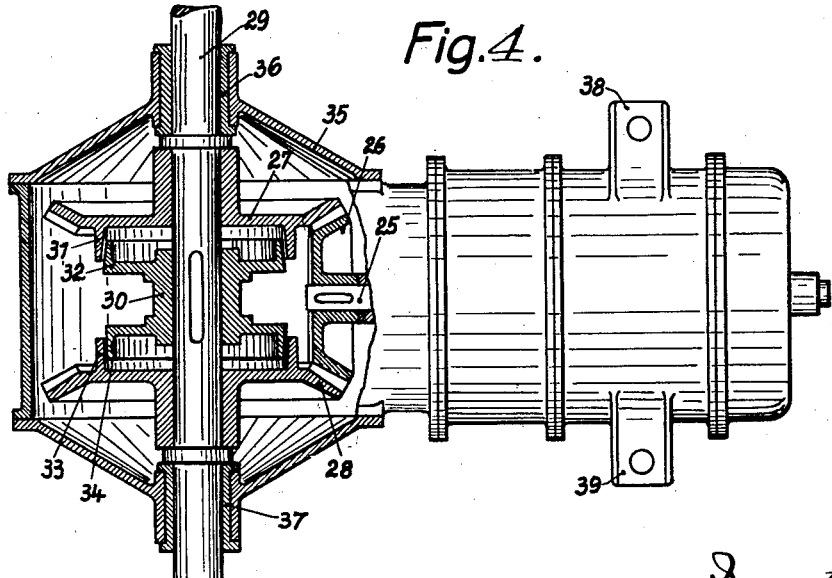
Figure 5:
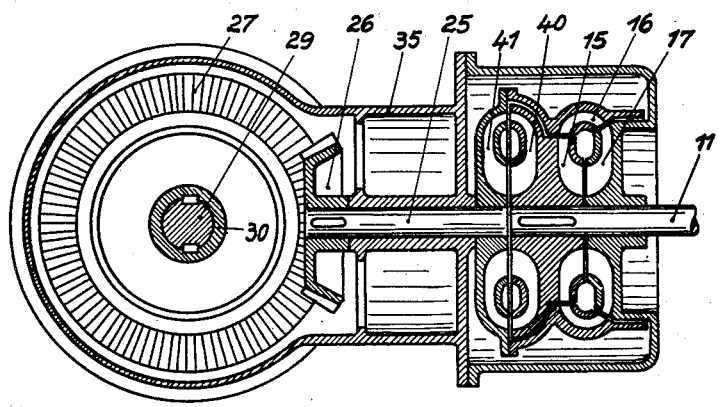
Figs. 5 and 6 are, respectively, similar vertical and horizontal sections through another form of gearing which embodies the invention.
Figure 6:
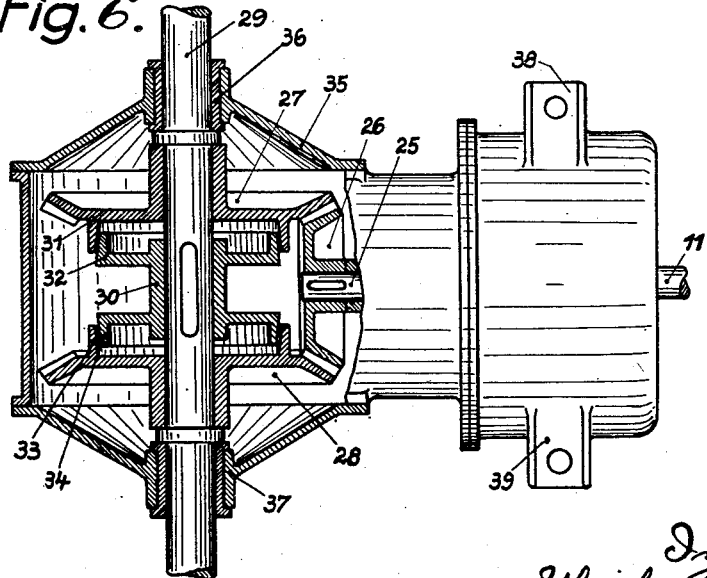

In the embodiment of Figures 5 and 6 which has hydraulic gearing of simple type, the motor-driven shaft 11 carries the pump wheel 15 of the torque transformer 15/16/17 incorporating guide vanes, and the primary wheel 40 of the hydraulic coupling 40/41 without guide vanes. The turbine wheel 16 of the transformer is fast to the secondary wheel 41 of the coupling which is fast on the shaft 25. A very compact construction is possible when, as illustrated, the primary wheels of the two hydraulic units form a single assembly rotatable within a single casing. As in many cases the speeds afforded by the transformer and coupling suffice, in the present embodiment the bevel wheel reverse gear 26/27/28, the construction and operation of which are identical with Figures 3 and 4, is connected directly to the shaft 25. Further, the casing 35 is again borne by bearings 36 and 37 on the vehicle axle 29 and suspended from the vehicle frame by arms 38 and 39.

Under particularly simple operating conditions, naturally a Föttinger torque-transformer with guide vanes can be used alone, i. e. a single liquid circuit can be arranged in conjunction with toothed wheels in a similar manner to that above described.

I claim:
1. In transmission gear for self-propelled vehicles having a frame sprung upon the axle which carries the driving wheels, the combination of a jointed driving shaft adapted to be driven by an engine mounted on said frame, and a hydrodynamic torque transformer driven by said shaft and connected to said axle, the axis of the torque transformer being longitudinal of the vehicle, said transformer being semi-sprung mounted upon said axle and frame.

2. In transmission gear for self-propelled vehicles, the combination with a vehicle frame, transverse axles and wheels, and spring means between said frame and said axles, of a jointed driving shaft, a hydrodynamic torque transformer driven by said shaft with its axis longitudinal of the vehicle, gear wheels connecting said transformer with one of said axles, and a casing enclosing said transformer and gear wheels, and means pivotally mounting said casing upon the said axle and suspending the same from the vehicle frame.

3. In transmission gear for self-propelled vehicles, a jointed driving shaft longitudinal of the vehicle, hydrodynamic gearing driven by and in line with said shaft, a transverse driven axle, gear wheel change speed gearing connecting said driven axle to said hydrodynamic gearing, a vehicle frame spring-mounted upon said axle, and a casing enclosing all said gearing borne upon said axle and suspended from the vehicle frame.

4. In a transmission gear for self-propelled vehicles, the combination with a vehicle including a frame supported upon a transverse axle, of a driving shaft extending longitudinally of the vehicle, a driven shaft in axial alinement with the driving shaft, a hydrodynamic torque transformer and a hydraulic coupling connected between said shafts, and reversing gears, said transformer and coupling having primary wheels forming a single assembly rotatable within a single casing.

5. In a self-propelled vehicle, the combination with a vehicle including a frame, a transversely arranged driving axle, and wheels on said axle, of a driving shaft extending longitudinally of said vehicle, and a plurality of alternatively operable torque-increasing means between said shaft and axle, each of said means comprising a Föttinger torque transformer in series arrangement with mechanical gears, the axes of each torque transformer extending longitudinally of the vehicle.

6. A self-propelled vehicle as claimed in claim 5, wherein said means are enclosed in a casing, said casing being pivotally mounted on said axle and spring-suspended from said vehicle frame.

ULRICH BARSKE.